(12) United States Patent
Bahrami et al.

(10) Patent No.: US 12,475,318 B2
(45) Date of Patent: Nov. 18, 2025

(54) DEEP PARAMETER LEARNING FOR CODE SYNTHESIS

(71) Applicant: FUJITSU LIMITED, Kanagawa (JP)

(72) Inventors: Mehdi Bahrami, San Jose, CA (US); Wei-Peng Chen, Fremont, CA (US)

(73) Assignee: Fujitsu Limited, Kawasaki (JP)

( * ) Notice: Subject to any disclaimer, the term of this patent is extended or adjusted under 35 U.S.C. 154(b) by 27 days.

(21) Appl. No.: 17/814,518

(22) Filed: Jul. 24, 2022

(65) Prior Publication Data

US 2023/0096325 A1    Mar. 30, 2023

Related U.S. Application Data

(60) Provisional application No. 63/261,602, filed on Sep. 24, 2021.

(51) Int. Cl.
*G06F 9/445* (2018.01)
*G06F 8/30* (2018.01)
(Continued)

(52) U.S. Cl.
CPC ............ *G06F 40/30* (2020.01); *G06F 8/30* (2013.01); *G06F 8/36* (2013.01); *G06F 8/42* (2013.01);
(Continued)

(58) Field of Classification Search
CPC ...... G06F 40/30; G06F 16/951; G06F 40/166; G06F 40/40; G06F 40/211; G06F 40/24;
(Continued)

(56) References Cited

U.S. PATENT DOCUMENTS 11,144,725 B2   10/2021   Luo
11,327,722 B1    5/2022   Bahrami et al.
(Continued)

OTHER PUBLICATIONS

Tuarob, Suppawong et al., "Automatic Tag Recommendation for Metadata Annotation Using Probabilistic Topic Modeling." Proceedings of the 13th ACM/IEEE-CS Joint Conference on Digital Libraries. 2013, pp. 239-248. (Year: 2013).
(Continued)

*Primary Examiner* — Chuck O Kendall
(74) *Attorney, Agent, or Firm* — Fujitsu Intellectual Property Center

(57) ABSTRACT

According to an aspect of an embodiment, operations for deep parameter learning for code synthesis are provided. The operations may include receiving a source code file and generating an abstract syntax tree (AST). The operations may further include determining a set of classes, and functions/procedures from the computer-executable code and extracting metadata associated to each component. The operations may further include selecting a subset of functions for which descriptions in the extracted metadata satisfy filtering criteria and updating the computer-executable code by filtering lines of code (LoCs) corresponding to the subset of functions/procedures. The operations may further include generating a dataset of code features and respective metadata features that includes a deep connection between parameters and its usage based on the updated computer-executable code and the metadata generation task. The operations may further include training a language model on a sequence-to-sequence generation task, based on the dataset.

18 Claims, 8 Drawing Sheets

(51) Int. Cl.

| | |
|---|---|
| G06F 8/36 | (2018.01) |
| G06F 8/41 | (2018.01) |
| G06F 8/65 | (2018.01) |
| G06F 8/73 | (2018.01) |
| G06F 11/362 | (2025.01) |
| G06F 16/951 | (2019.01) |
| G06F 18/20 | (2023.01) |
| G06F 18/22 | (2023.01) |
| G06F 18/23213 | (2023.01) |
| G06F 40/166 | (2020.01) |
| G06F 40/211 | (2020.01) |
| G06F 40/216 | (2020.01) |
| G06F 40/242 | (2020.01) |
| G06F 40/30 | (2020.01) |
| G06F 40/40 | (2020.01) |
| G06F 40/44 | (2020.01) |
| G06N 3/04 | (2023.01) |
| G06N 3/08 | (2023.01) |

(52) U.S. Cl.
CPC .............. *G06F 8/436* (2013.01); *G06F 8/65* (2013.01); *G06F 8/73* (2013.01); *G06F 11/3624* (2013.01); *G06F 16/951* (2019.01); *G06F 18/22* (2023.01); *G06F 18/23213* (2023.01); *G06F 18/285* (2023.01); *G06F 40/166* (2020.01); *G06F 40/211* (2020.01); *G06F 40/216* (2020.01); *G06F 40/242* (2020.01); *G06F 40/40* (2020.01); *G06F 40/44* (2020.01); *G06N 3/04* (2013.01); *G06N 3/08* (2013.01)

(58) Field of Classification Search
CPC .. G06F 40/216; G06F 18/22; G06F 18/23213; G06F 8/36; G06F 8/42; G06F 8/436; G06F 8/65; G06F 8/73; G06F 11/3624; G06N 3/04; G06N 3/08
See application file for complete search history.

(56) References Cited

U.S. PATENT DOCUMENTS

| | | | |
|---|---|---|---|
| 11,545,134 | B1 | 1/2023 | Federico et al. |
| 2017/0214701 | A1* | 7/2017 | Hasan ................. H04L 63/1491 |
| 2018/0024911 | A1* | 1/2018 | Kruszewski ........ G06F 11/3664 717/125 |
| 2018/0373507 | A1* | 12/2018 | Mizrahi ................... G06F 18/24 |
| 2020/0349468 | A1 | 11/2020 | Arya et al. |
| 2021/0191696 | A1* | 6/2021 | Ibarra Von Borstel ... G06F 8/36 |
| 2022/0066747 | A1* | 3/2022 | Drain ...................... G06N 5/046 |
| 2022/0198294 | A1 | 6/2022 | Schneuwly |
| 2022/0215167 | A1 | 7/2022 | Rajpathak |

OTHER PUBLICATIONS

Bernasconi, Anna, et al. "Meta-Base: A Novel Architecture for Large-Scale Genomic Metadata Integration", IEEE/ACM Transactions on Computational Biology and Bioinformatics, vol. 19, No. 1, pp. 543-557, (Year: 2020).

Jones, Matthew B., et al., "Managing Scientific Metadata", IEEE Internet Computing 5.5, pp. 59-68. (Year: 2001).

Yan, Cong et al., "Synthesizing Type-Detection Logic for Rich Semantic Data Types Using Open-Source Code", SIGMOD'18, Proceedings of the 2018 International Conference on Management of Data, 2018, pp. 35-50, (Year: 2018).

U.S. Office Action mailed Dec. 22, 2023 for copending U.S. Appl. No. 17/814,516, 23 pages.

Feng, Zhangyin, et al. "Codebert: A pre-trained model for programming and natural languages." arXiv preprint arXiv:2002.08155 (2020).

"CodeXGLUE" retrieved from the Internet: <URL:https://github.com/microsoft/CodeXGLUE>.

Yin, Pengcheng, and Graham Neubig. "TRANX: A transition-based neural abstract syntax parser for semantic parsing and code generation." arXiv preprint arXiv:1810.02720 (2018).

Yin, Pengcheng, et al. "Learning to mine aligned code and natural language pairs from stack overflow." Proceedings of the 15th International Conference on Mining Software Repositories. 2018. arXiv:1805.08949v1 [cs.CL] May 23, 2018.

Oda, Yusuke, et al. "Learning to generate pseudo-code from source code using statistical machine translation." 2015 30th IEEE/ACM International Conference on Automated Software Engineering (ASE). IEEE, 2015.

Yin, Pengcheng, and Graham Neubig. "A syntactic neural model for general-purpose code generation." arXiv preprint arXiv:1704.01696 (2017).

CodeXGLUE—Text2Code Generation, retrieved from the Internet: <URL: https://github.com/microsoft/CodeXGLUE/tree/main/Text-Code/text-to-code>.

Fudaba, Hiroyuki, et al. "Pseudogen: A tool to automatically generate pseudo-code from source code." 2015 30th IEEE/ACM International Conference on Automated Software Engineering (ASE). IEEE, 2015.

McKay, Cory, and Ichiro Fujinaga. "Improving Automatic Music Classification Performance by Extracting Features from Different Types of Data", Proceedings of the International Conference on Multimedia Information Retrieval, 2010, pp. 257-266.

Schober, Daniel, et al. "nmrML: A Community Supported Open Data Standard for the Description, Storage, and Exchange of NMR Data", Analytical Chemistry 90.1 (2018): pp. 649-656, ACS publications.

Albrecht, Felipe, et al. "Deep Blue epigenomic data server: programmatic data retrieval and analysis of epigenome region sets", Nucleic acids research 44.W1 (2016), pp. W581-W586.

USPTO—Notice of Allowance mailed on Jun. 6, 2024 for related U.S. Appl. No. 17/814,516 (allowed).

\* cited by examiner

Electronic User Interface 300

```
def list(abcrepository, force_reload=False, skip_validation=False):
    r"""
    List all callable entrypoints available in the repo specified by ``abcrepository``.
    Args:
        abcrepository(string): a string with format "repo_owner/repo_name[:tag_name]" with an optional
            tag/branch. If ``tag_name`` is not specified, the default branch is assumed to be ``main`` if
            it exists, and otherwise ``master``.
            Example: 'pytorch/vision:0.10'
        force_reload (bool, optional): whether to discard the existing cache and force a fresh download.
            Default is ``False``.
        skip_validation (bool, optional): if ``False``, torchhub will check that the branch or commit
            specified by the ``abcrepository`` argument properly belongs to the repo owner. This will make
            requests to the abcrepository API; you can specify a non-default abcrepository token by setting the
            ``ABCREPOSITORY_TOKEN`` environment variable. Default is ``False``.
    Returns:
        list: The available callables entrypoint
    Example:
        >>> entrypoints = torch.hub.list('pytorch/vision', force_reload=True)
    """
    repo_dir = _get_cache_or_reload(abcrepository, force_reload, verbose=True,
        skip_validation=skip_validation)
    sys.path.insert(0, repo_dir)
    hubconf_path = os.path.join(repo_dir, MODULE_HUBCONF)
    hub_module = _import_module(MODULE_HUBCONF, hubconf_path)
    sys.path.remove(repo_dir)
    entrypoints = [f for f in dir(hub_module) if callable(getattr(hub_module, f)) and not f.startswith("_")]
    return entrypoints
```

704:
```
def data_filter(data,selected_user_notebooks):
    output=[]
    print(db_user , db_notebook)
    found_rec = None
    flage=false
    path=f"{input_path}/out*.json"
    all_json_path=glob(path)
    for j_path in all_json_path:
        jdata=json.load(open(j_path))
        for rec in jdata:
            url=rec['url']
            j_user=url.split('/')[-2]
            j_CurrentUrlSlug=url.split('/')[-1]
            if db_user == j_user and db_notebook
              == j_currentUrlSlug:
                found_rec= rec
                break
        if found_rec is not None:
            break
    if found_rec is not None:
        output.append(found_rec)
    return output
```

System 702

706:
```
def data_filter(data,selected_user_notebooks):
    for index, (db_user, db_notebook) in enumerate(selected_user_notebooks):
        path=f"{input_path}/out*.json"
        for j_path in all_json_path:
            jdata=json.load(open(j_path))
            for rec in jdata:
                url=rec['url']
                j_user=url.split('/')[-2]
                j_CurrentUrlSlug=url.split('/')[-1]
                if db_user == j_user and db_notebook ==
                  j_CurrentUrlSlug:
                    found_rec = rec
            if found_rec is not None:
                output.append(found_rec)
    return output
```

FIG. 8

DEEP PARAMETER LEARNING FOR CODE SYNTHESIS

CROSS-REFERENCE TO RELATED APPLICATIONS/INCORPORATION BY REFERENCE

This application claims priority to U.S. Provisional Patent Application Ser. No. 63/261,602 filed on Sep. 24, 2021, titled, "Library Corpus for Large-Scale Language Models and Code Retrieval Models Using Augmented Code", the entire content of which is hereby incorporated herein by reference.

FIELD

The embodiments discussed in the present disclosure are related to deep parameter learning for code synthesis.

BACKGROUND

With advancements in machine learning, various types of language models have been developed for different machine-programming tasks, such as code synthesis or code retrieval. A language model is a statistical representation of probability distribution for a sequence of words where it aims to find relations between different words by processing a large corpora. Some language models aim to learn general-purpose representations that support downstream Natural Language-Programming language (NL-PL) applications such as code synthesis. Code synthesis corresponds to a task where a machine (such as a computer) aims to generate a computer-executable code for a given query as input. To perform code synthesis using a language model, the language model has to be trained initially on a dataset that includes training samples. The quality of training samples included in the dataset significantly impacts the overall performance of the language model. For training the language model, many state-of-the-art techniques mainly focus on the quantity of training samples rather than the quality of the training samples.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, operations may include receiving a source code file associated with a software package and generating an abstract syntax tree (AST) of at least a portion of a computer-executable code included in the source code file. The operations may further include determining a set of functions/procedures of all defined classes from the computer-executable code, based on the AST and extracting metadata associated with the set of functions from the computer-executable code. The operations may further include selecting a subset of functions from the set of functions for which descriptions in the extracted metadata satisfy filtering criteria. The operations may further include updating the computer-executable code by filtering lines of code (LoCs) corresponding to the subset of functions/procedures from the computer-executable code. The operations may further include generating a training dataset of code features and respective metadata features based on the updated computer-executable code and the metadata. Thereafter, the operations may include training a language model on a sequence-to-sequence generation task, based on the training dataset.

The objective and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 3 is a diagram that depicts an exemplary source code file for deep parameter learning;

FIG. 7 is a diagram that depicts an exemplary computer-executable code and an updated version of the exemplary computer-executable code;

FIG. 8 is a diagram that illustrates an exemplary scenario for training of a language model for code synthesis based on deep parameter learning;

Figure 1:
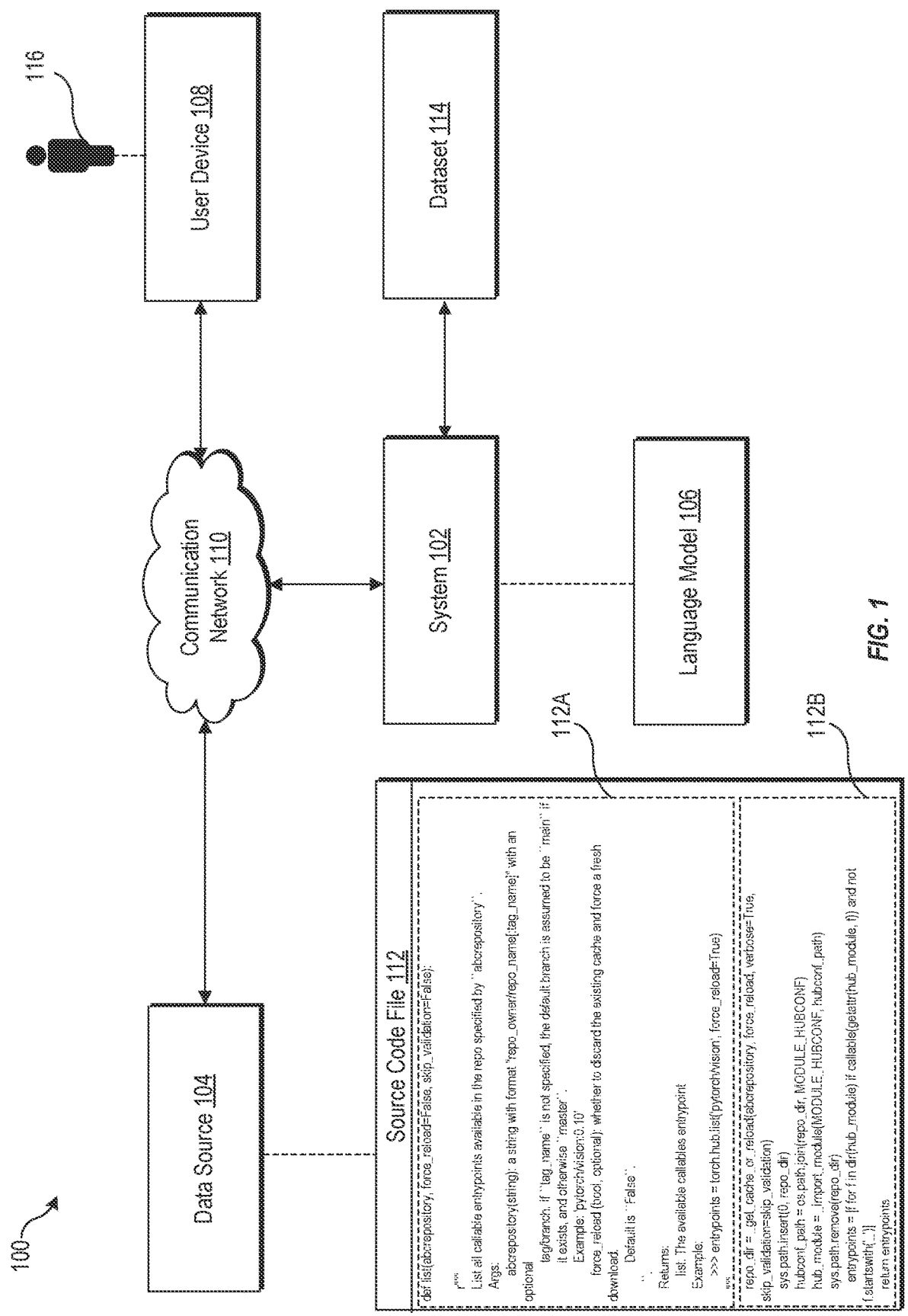
FIG. 1 is a diagram representing an exemplary environment related to deep parameter learning for code synthesis.

all according to at least one embodiment described in the present disclosure.

DESCRIPTION OF EMBODIMENTS

Machine learning has led to the development of language models for various machine-programming tasks. A language model is a probabilistic model that provides a statistical representation of probability distribution for a sequence of words where it aims to find relation between different words by processing a large corpora. For instance, the language model may be able to predict the likelihood of word "pandas" appears after "import" as such "from nbconvert.preprocessors import ExecutePreprocessor". Specifically, given a sequence of length "m", the language model may assign a probability $P(w_1, w_2, \ldots w_m)$ to the whole sequence.

Language models are being used in a variety of sequence-to-sequence generation tasks such as a code synthesis task, a code retrieval task, or a software package analysis task. The code synthesis task corresponds to a task of generation of a source-code based on a natural language query. The code retrieval task corresponds to a task of retrieval of code snippets relevant to a given natural language query from a code base. The software package analysis task corresponds to a task of analysis of the software package for relevant information.

To perform the above-mentioned sequence-to-sequence generation tasks, the language models have to be trained on examples of datasets. For example, in case of code synthesis task, the language model has to be trained on a dataset that includes pairs of code snippets and natural language queries. The code snippets may include natural language text such as docstrings and comments that may be related to the code snippet and semantically similar to the corresponding natural language query. However, in some code snippets the natural language text is not present. In such a scenario, the language models determine the relation between the code snippet and the natural language query based on the keywords present in the code snippet.

Current state-of-art techniques for the training of the language models use only code snippet and natural language queries irrespective of the presence of the natural language text within the code snippet. The training of the language models using such dataset results in language models that are less generalized and lack accuracy. Therefore, there is a need to generate a filtered dataset such that when the language model is trained on such filtered dataset, the trained language model is generalized and accurate (in comparison to language model trained on unfiltered dataset).

The disclosure uses the code snippets that includes detailed information related to function metadata and existing natural language description (such as comments or docstrings) for training the language model. Specifically, the disclosure uses metadata associated with the code snippets in the training dataset for training the language model. The disclosure provides an enriched dataset that can be used to train the language model with function parameters, return value(s), and the corresponding natural language text associated with the code snippet. The disclosure also provides a method to filter out code snippets for which the natural language text is absent. Also, the disclosure provides a method to prune the code snippet for generation of the training dataset.

In contrast to current state-of-the-art approaches, the disclosure provides an approach to obtain a dataset that helps to achieve a more generalized language model as compared to language models obtained using state-of-the-art approaches. Also, the disclosed language model may help software engineers, data scientists, or developers to generate code with more details as compared to state-of-the-art methods. Based on experimental data, it has been observed that the performance of the language model trained based on filtered datasets may be better than the language models trained based on the current state-of-the-art approaches.

Embodiments of the present disclosure are explained with reference to the accompanying drawings.

FIG. 1 is a diagram representing an exemplary environment related to deep parameter learning for code synthesis, arranged in accordance with at least one embodiment described in the present disclosure. With reference to FIG. 1, there is shown an example environment 100. In the example environment 100, there is shown a system 102 and a data source 104. There is further shown a language model 106, a user device 108, a communication network 110, a source code file 112, and a dataset 114. The system 102, the data source 104, and the user device 108 may be communicatively coupled to each other, via the communication network 110.

There is further shown a user 116 who may be associated with the user device 108. Examples of the user device 108 may include, but are not limited to, a mobile device, a desktop computer, a laptop, or a computer workstation. In one or more embodiments, the user device 108 may include a user-end terminal device and a server communicatively coupled to the user-end terminal device. Examples of the user-end terminal device may include, but are not limited to, a mobile device, a desktop computer, a laptop, or a computer workstation.

The data source 104 may include suitable logic, circuitry, and interfaces that may be configured to store the source code file 112. The source code file 112 may be associated with a software package and may include a computer-executable code 112A. In an embodiment, the data source 104 may store metadata associated with the software package. Examples of the data source 104 may include, but are not limited to, a web-based code hosting server, a database server, a file server, a web server, a Really Simple Syndication (RSS) feed, and servers that host website(s) and web application(s) related to packages.

In an embodiment, the data source 104 may be implemented as multiple servers, which may include storage distributed across one or more availability zones (e.g., datacenters). In an embodiment, the data source 104 may include a front-end system and a back-end system. The front-end system may be configured to provide an interface (such as a webpage or a client-side interface of a web-application) to view information associated with the package data. The back-end system may store databases, logic, and instructions to display content on the interface provided by the front-end system.

The language model 106 may be a probabilistic model that may be trained to generate probability distribution over sequences on an alphabet of tokens. The language model 106 may be one of a statistical language model or a neural language model. The statistical language model may use statistical techniques to learn the probability distribution. These statistical techniques may include, for example, a unigram technique, a N-gram technique, a Hidden Markov Models (HMM), and other linguistic rules. Details of the implementation of the above-mentioned statistical techniques are known in the art. Therefore, a detailed description of the above-mentioned statistical techniques has been omitted for the sake of brevity.

The neural language model may use one or more neural networks to learn the probability distribution of words. In an embodiment, each of the one or more neural networks included in the neural language model may be a computational network or a system of artificial neurons, arranged in a plurality of layers, as nodes. The plurality of layers of the neural network may include an input layer, one or more hidden layers, and an output layer. Each layer of the plurality of layers may include one or more nodes (i.e., artificial neurons). Outputs of all nodes in the input layer may be coupled to at least one node of hidden layer(s). Similarly, inputs of each hidden layer may be coupled to outputs of at least one node in other layers of the neural network. Outputs of each hidden layer may be coupled to inputs of at least one node in other layers of the neural network. Node(s) in the final layer may receive inputs from at least one hidden layer to output a result. The number of layers and the number of nodes in each layer may be determined from hyper-parameters of the neural network. Such hyper-parameters may be set before or after training the neural network on the dataset 114.

Each node of the neural network may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the neural network. All or some of the nodes of the neural network may correspond to same or a different mathematical function.

In training of the neural network, one or more parameters of each node of the neural network may be updated, based on whether output of the final layer for a given input (from the dataset 114) matches a correct result based on a loss function for the neural network. The above process may be repeated for same or a different input till a minima of loss function is achieved, and a training error is minimized. Several methods for training are known in art, for example, gradient descent, stochastic gradient descent, batch gradient descent, gradient boost, meta-heuristics, and the like.

The neural language model may include electronic data, which may be implemented as, for example, a software component of an application executable on the system 102. The neural language model may rely on libraries, external scripts, or other logic/instructions for execution by a processing device, such as a processor. The neural language model may include code and routines configured to enable a computing device, such as the processor to perform one or more operations for generation of the lines of computer-executable code 112A for a natural language query as an input to the neural language model. Additionally, or alternatively, the neural language model may be implemented using hardware including a processor, a microprocessor (e.g., to perform or control performance of one or more operations), a field-programmable gate array (FPGA), or an application-specific integrated circuit (ASIC). Alternatively, in some embodiments, the neural language model may be implemented using a combination of hardware and software.

Examples of each of the one or more neural networks may include, but are not limited to, a deep neural network (DNN), a convolutional neural network (CNN), a recurrent neural network (RNN), a CNN-recurrent neural network (CNN-RNN), an artificial neural network (ANN), a Long Short Term Memory (LSTM) network based RNN, LSTM+ANN, a gated recurrent unit (GRU)-based RNN, a fully connected neural network, a Connectionist Temporal Classification (CTC) based RNN, a deep Bayesian neural network, and/or a combination of such networks. In certain embodiments, each of the one or more neural networks may be based on a hybrid architecture of multiple Deep Neural Networks (DNNs).

In an embodiment, the language model 106 may correspond to a DNN that uses an encoder-decoder architecture. The DNN may be trained to generate lines of computer-executable code 112A for a natural language query as an input to the language model 106. Specifically, such a language model may include an encoder neural network and a decoder neural network. Examples of such a DNN may include, but are not limited to, a Long Short-Term Memory (LSTM) network, a gated recurrent unit (GRU) network, a transformer model, or a variant of the transformer model, such as such as a Bidirectional Encoder Representations from Transformers (BERT) model or CodeBERT model.

In operation, the system 102 may be configured to receive the source code file 112 from the data source 104. The source code file 112 may be associated with a software package and may include the computer-executable code 112A. In an embodiment, the source code file 112 may include resource files associated with the software package. Details about reception of the source code file 112 are provided, for example, in FIG. 3 and FIG. 4.

Upon reception, the system 102 may be further configured to generate an abstract syntax tree (AST) of at least a portion of the computer-executable code 112A included in the source code file 112. An AST may correspond to a tree representation of the abstract syntactic structure of the computer-executable code 112A in a particular programming language, such as Python, Java®, or JavaScript. Each node of the tree may denote a construct that may occur in the computer-executable code 112A. More specifically, the AST may be a tree representation of the computer-executable code 112A that may be primarily used by compilers (or interpreters) to read the computer-executable code 112A and generate target binaries. Details about the generation of the AST are provided, for example, in FIG. 4.

The system 102 may be further configured to determine a set of functions (also referred as a set of procedures) from the computer-executable code 112A. The set of functions may be determined based on the generated AST. Each function of the set of functions may be a self-contained module of the computer-executable code 112A that may accomplish a specific task (e.g., addition of two numbers or concatenation of two strings). The system 102 may be further configured to extract metadata 112B that may be associated with the set of functions from the computer-executable code 112A. In an embodiment, the metadata 112B may be extracted from docstrings and comments that may be associated with the set of functions.

The system 102 may be further configured to select a subset of functions for which descriptions in the extracted metadata 112B satisfy filtering criteria. The subset of functions may be extracted from a set of functions. The filtering criteria may specify rules of selecting a function from the set of functions. In accordance with an embodiment, the rules may include a first rule to determine whether a description is present in the metadata 112B and a second rule to determine whether the description in the metadata 112B includes a description of the one or more parameters associated with the function and a description of one or more return values associated with the function. Details about the filtering criteria are provided, for example, in FIG. 4.

The system 102 may be configured to update the computer-executable code 112A by filtering lines of code (LoCs) corresponding to the subset of functions from the computer-executable code 112A. The system 102 may be further configured to generate the dataset 114 of code features and respective metadata features based on the updated computer-executable code 112A and the metadata 112B. Details about the code features and respective metadata features are provided, for example, in FIG. 7. The system 102 may be further configured to train the language model 106 on a sequence-to-sequence generation task, based on the dataset 114. Such a sequence-to-sequence generation task may correspond to a code synthesis task, a code retrieval task, or a software package analysis task, for example. Details about the training of the language model 106 are provided, for example, in FIG. 7.

It should be noted that the communication between the system 102, the data source 104, the language model 106, and the user device 108 may be performed via the communication network 110. The communication network 110 may include a communication medium through which the system 102 may communicate with the data source 104, the language model 106, the user device 108, and/or different devices (not shown). Examples of the communication network 110 may include, but are not limited to, the Internet, a cloud network, a cellular network (such as a 4th Generation Long-Term Evolution (LTE) or 5th generation New Radio (NR)), a Wireless Fidelity (Wi-Fi) network, a Personal Area Network (PAN), a Local Area Network (LAN), and/or a Metropolitan Area Network (MAN). Various devices in the example environment 100 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof Modifications, additions, or omissions may be made to the system 102 without departing from the scope of the present disclosure. For example, in some embodiments, the system 102 may include any number of other components that may not be explicitly illustrated or described.

Figure 2:
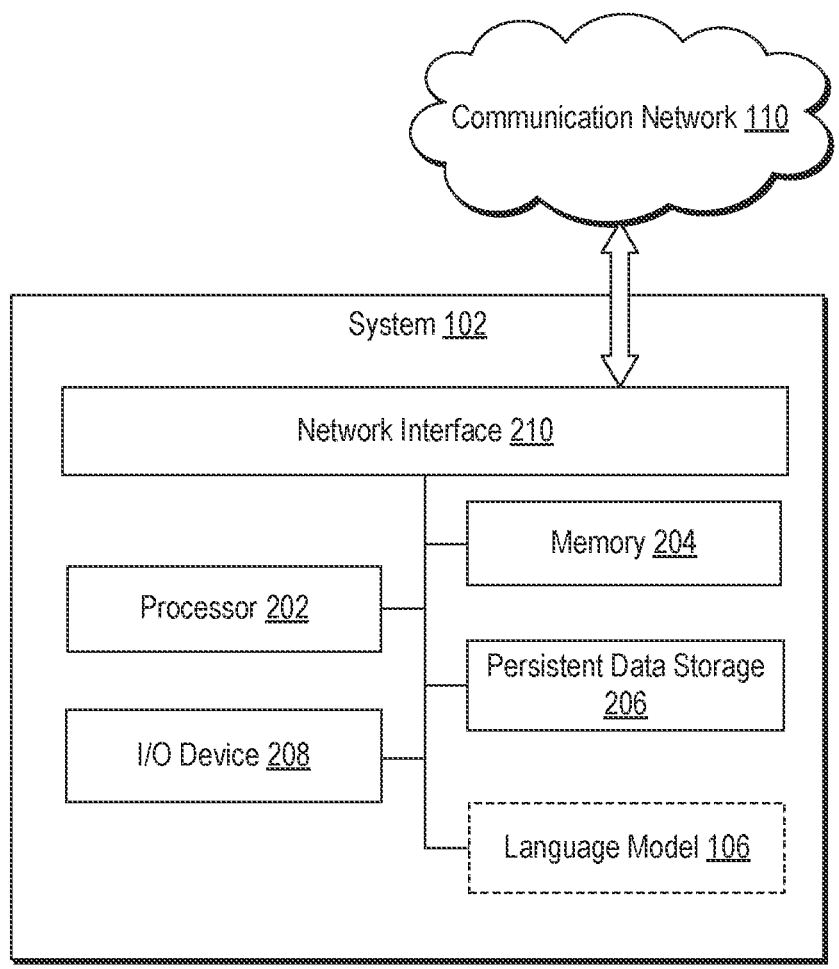
FIG. 2 is a block diagram of a system for deep parameter learning for code synthesis.

FIG. 2 is a block diagram of a system for deep parameter learning for code synthesis, arranged in accordance with at least one embodiment described in the present disclosure. FIG. 2 is explained in conjunction with elements from FIG. 1. With reference to FIG. 2, there is shown a block diagram 200 of the system 102 of FIG. 1. The block diagram 200 may further include a processor 202, a memory 204, a persistent data storage 206, an I/O block 208, a network interface 210, and the language model 106.

The processor 202 may include suitable logic, circuitry, and/or interfaces that may be configured to execute program instructions associated with different operations to be executed by the system 102. The processor 202 may include any suitable special-purpose or general-purpose computer, computing entity, or processing device, including various computer hardware or software modules, and may be configured to execute instructions stored on any applicable computer-readable storage media. For example, the processor 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 202 may include any number of processors configured to, individually or collectively, perform or direct performance of any number of operations of the system 102, as described in the present disclosure.

In some embodiments, the processor 202 may be configured to interpret and/or execute program instructions and/or process data stored in the memory 204 and/or the persistent data storage 206. In some embodiments, the processor 202 may fetch program instructions from the persistent data storage 206 and load the program instructions in the memory 204. After the program instructions are loaded into memory 204, the processor 202 may execute the program instructions. Some of the examples of the processor 202 may be a Central Processing Unit (CPU), a Reduced Instruction Set Computer (RISC) processor, an ASIC processor, a Complex Instruction Set Computer (CISC) processor, a Graphical Processing Unit (GPU), a co-processor, and/or a combination thereof.

The memory 204 may include suitable logic, circuitry, and/or interfaces that may be configured to store program instructions executable by the processor 202. In certain embodiments, the memory 204 may be configured to store the received source code file 112, the extracted metadata 112B, the set of functions, the metadata features, list of software packages, resource files, and the generated dataset 114. In certain embodiments, the memory 204 may be configured to store the language model 106. The memory 204 may include computer-readable storage media for carrying or having computer-executable instructions or data structures stored thereon. Such computer-readable storage media may include any available media that may be accessed by a general-purpose or special-purpose computer, such as the processor 202.

By way of example, and not limitation, such computer-readable storage media may include tangible or non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 202 to perform a certain operation or group of operations associated with the system 102.

The persistent data storage 206 may include suitable logic, circuitry, and/or interfaces that may be configured to store program instructions executable by the processor 202. The persistent data storage 206 may include computer-readable storage media for carrying or having computer-executable instructions or data structures stored thereon. Such computer-readable storage media may include any available media that may be accessed by a general-purpose or special-purpose computer, such as the processor 202.

By way of example, and not limitation, such computer-readable storage media may include tangible or non-transitory computer-readable storage media including optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 202 to perform a certain operation or group of operations associated with the system 102.

The I/O device 208 may include suitable logic, circuitry, interfaces, and/or code that may be configured to receive one or more user inputs. The I/O device 208 may be further configured to provide an output in response to the one or more user inputs. The I/O device 208 may include various input and output devices, which may be configured to communicate with the processor 202 and other components, such as the network interface 210. Examples of the input devices may include, but are not limited to, a touch screen, a keyboard, a mouse, a joystick, and/or a microphone. Examples of the output devices may include, but are not limited to, a display device and a speaker.

The network interface 210 may include suitable logic, circuitry, interfaces, and/or code that may be configured to establish a communication among the system 102, the data source 104, the language model 106, and the user device 108 via the communication network 110. The network interface 210 may be implemented by use of various known technologies to support wired or wireless communication of the system 102, via the communication network 110. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 210 may communicate via wireless communication with networks, such as the Internet, an Intranet, and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), or Wi-MAX.

The functions or operations executed by the system 102, as described in FIG. 1, may be performed by the processor 202. Operations executed by the processor 202 are described in detail, for example, in FIG. 3, FIG. 4, FIG. 5, FIG. 6A, FIG. 6B, FIG. 7, and FIG. 8.

FIG. 3 is a diagram that depicts an exemplary source code file for deep parameter learning for code synthesis, according to at least one embodiment described in the present disclosure. FIG. 3 is explained in conjunction with elements from FIG. 1 and FIG. 2. With reference to FIG. 3, there is shown an electronic User Interface (UI) 300. The electronic UI 300 may be displayed on the user device 108. Within the electronic UI 300, there is further shown source code file 302. The source code file 302 may include a computer-executable code 304 and metadata 306.

In an embodiment, the system 102 may be configured to receive the source code file 302 associated with a software package. The source code file 302 may be received from the data source 104. The source code file 302 may be associated with a software package, such as an Open-Source package in Python. The source code file 302 may include computer-executable code 304. The computer-executable code 304 may be written in a programming language, such as but not limited to, Python, C, C++, C#, Swift, JavaScript, Go, Java®, or R. With reference to FIG. 3, the computer-executable code 304 may be written in Python.

In an embodiment, the computer-executable code 304 may include a set of functions. Specifically, the computer-executable code 304 may include one or more of classes, methods included in the classes, and functions that may be different from the methods. In an embodiment, the set of functions may include methods and functions. As an example, the set of functions in the computer-executable code 304 includes "list( )", "_get_cache_or_reload( )", "sys.path.insert( )", "os.path.join( )", and "sys.path.remove_( )".

In addition to the computer-executable code 304, the source code file 302 may include metadata 306 associated with at least one of the set of functions. The metadata 306 may include at least one of a function name, a count of parameters associated with a function, a count of one or more default parameters associated with the function, a default value of the one or more default parameters, a type of each of the parameters, a description of the function, one or more decorators associated with the function, and the like. The description may include at least one of a description of each of the parameters, a description of a return value associated with the function, a description of the one or more default parameters associated with the function, or a description of an objective of the function. As shown, for example, the metadata 306 may be associated with "list( )" function and may include text, such as "List all callable entrypoints available in the repo specified by "abcrepository".Args: abcrepository (string): a string with format "repo_owner/repo_name[tag_name]" with an optional tag/branch . . . ".

Figure 4:
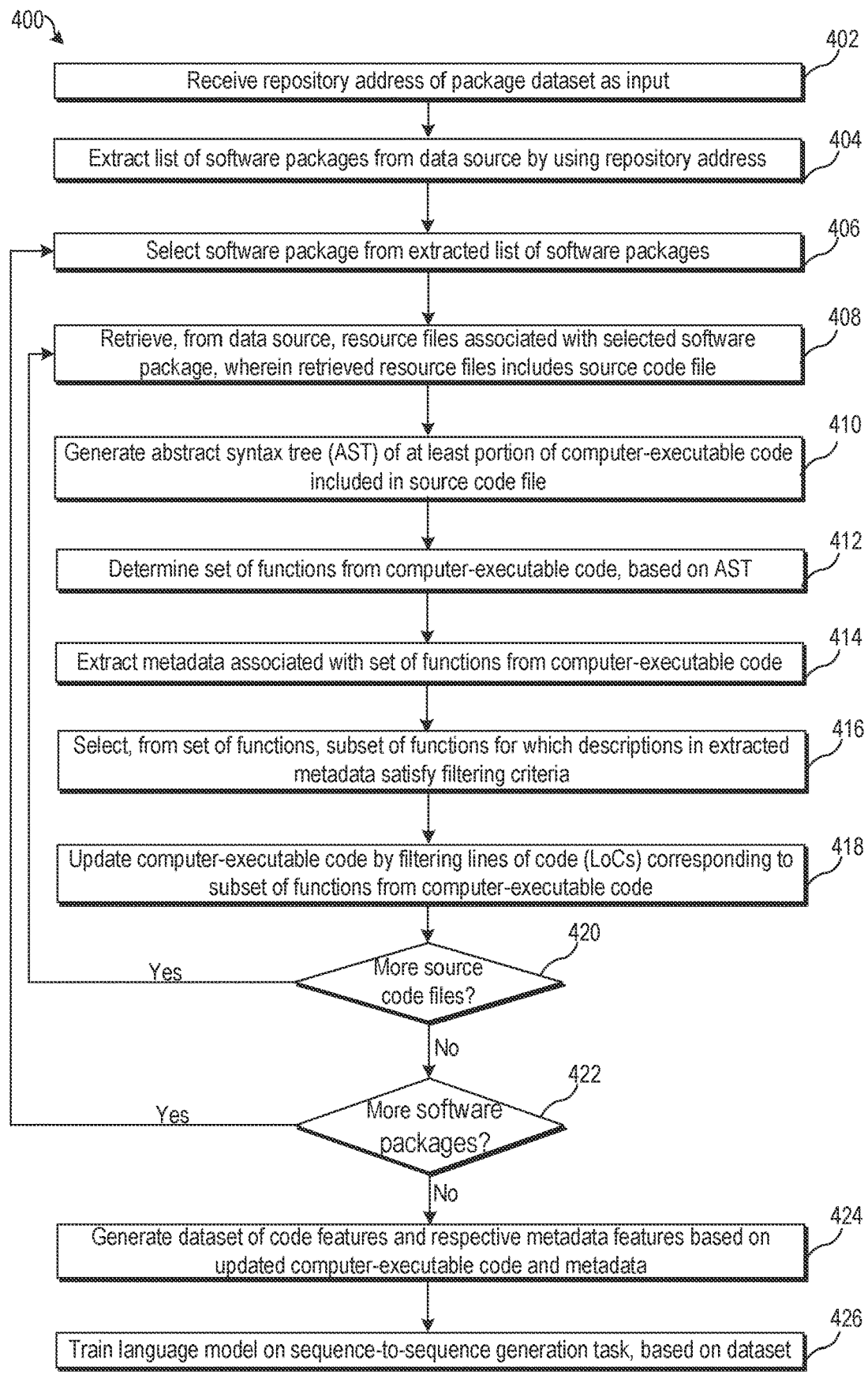
FIG. 4 illustrates a flowchart of an exemplary method of deep parameter learning.

FIG. 4 illustrates a flowchart of an exemplary method of deep parameter learning for code synthesis, according to at least one embodiment described in the present disclosure. FIG. 4 is explained in conjunction with elements from FIG. 1, FIG. 2, and FIG. 3. With reference to FIG. 4, there is shown a flowchart 400. The method illustrated in the flowchart 400 may start at 402 and may be performed by any suitable system, apparatus, or device, such as by the system 102 of FIG. 1 or FIG. 2.

At 402, a repository address of a package dataset may be received. In an embodiment, the system 102 may be configured to receive the repository address of the package dataset as an input from the user 116 via the user device 108. The repository address may be a uniform resource locator (URL) associated a webpage of the package dataset that may be hosted on the data source 104. The package dataset may include a list of software packages. Examples of the package dataset may include, but are not limited to, CodeSearchNet and Pytorrent.

At 404, a list of software packages may be extracted. In an embodiment, the system 102 may be configured to extract the list of software packages based on the received repository address. The list of software packages may be extracted from the data source 104 and such packages may be associated with the package dataset associated with the repository address. Each software package in the list of software packages may include resource files. As an example, these resource files may include information about resources such as, but not limited to, definitions, configurations, setups, requirements, and distributions associated with the software package.

At 406, a software package from the extracted list of software packages may be selected. In an embodiment, the software package may be selected based on a user input via the user device 108. In another embodiment, the system 102 may be configured to select the software package in a sequential (or alphabetical) order.

At 408, resource files associated with the selected software package may be retrieved. In an embodiment, the system 102 may be configured to scrape resource files associated with the selected software package from the data source 104. For example, the system 102 may be configured to use a web crawler or a web scraper to scrap the resource files.

The retrieved resource files may include the source code files 302 and package metadata associated with the selected software package. The source code files 302 may include the computer-executable code 304, which can be separated into elements such as functions, methods, classes, import statements, and loop statements. In an embodiment, the retrieved resource files may include files that provide information about resources such as, but not limited to, definitions, configurations, setups, requirements, and distributions associated with the selected software package.

At 410, an abstract syntax tree of at least a portion of a computer-executable code 304 may be generated. The AST may correspond a tree representation of the abstract syntactic structure of a portion of the computer-executable code 304 in a particular programming language, such as Python, Java®, or JavaScript. Each node of the tree may denote a construct that may occur in the portion of the computer-executable code 304. More specifically, the AST may be a tree representation of the portion of the computer-executable code 304 that may be primarily used by compilers (or interpretations) to read the portion of the computer-executable code 304 and generate target binaries. Details about the AST are provided in FIG. 6A.

At 412, a set of functions may be determined. In an embodiment, the set of functions may be determined from the AST of at least a portion of the computer-executable code 304. The set of functions may be included in at least the portion of the computer-executable code 304. Each function of the determined set of functions may have a name, one or more parameters, and at least one return value. Additionally, the determined set of functions may include one or more default parameters and one or more decorators. As a first example, a function may be defined as follows:

```
def list (abc, force_reload=False, skip_validation=False):
    repo_dir = _get_cache_or_reload(abc, force_reload, verbose=True,
    skip_validation=skip_validation)
    sys.path.insert(0, repo_dir)
    hubconf_path = os.path.join(repo_dir, MODULE_HUBCONF)
    hub_module = _import_module(MODULE_HUBCONF,
    hubconf_path)
    sys.path.remove(repo_dir)
    entrypoints = [f for f in dir(hub_module) if
    callable(getattr(hub_module, f)) and not f.startswith('_')]
    return entrypoints
```

At 414, the metadata 306 associated with the determined set of functions may be extracted from the computer-executable code 304. In an embodiment, the metadata 306 may be included as docstrings or comments in the computer-executable code 304 included in the source code file 302. The metadata 306 may include, for example, a function name, a count of parameters associated with a function, a count of one or more default parameters associated with the function, a default value of the one or more default parameters, a type of each of the parameters, a description of the function, or one or more decorators associated with the function. The description of the function may include at least one of a description of each of the parameters, a description of a return value associated with the function, a description of the one or more default parameters associated with the function, or a description of an objective of the function.

With reference to a function "list( )" in the first example, the function name may be "list". The count of parameters associated with the function may be three (i.e. "abc", "force_reload", "skip_validation"). The count of default parameters associated with the function may be two (i.e. "force_reload", "skip_validation"). The default values of the default parameters may be "False". The type of each parameter may correspond to a datatype associated with the respective parameter. As per the first example, Python uses Dynamic typing and hence the type of each parameter may be dynamically chosen at run-time based on the value associated with the corresponding parameter.

At 416, a subset of functions may be selected from the set of functions. The system 102 may be configured to select the subset of functions which satisfy filtering criteria, from the set of functions. The filtering criteria may specify rules for selecting a function from the set of functions. In an embodiment, the rules may include a first rule and a second rule. The first rule may determine whether a description of a corresponding function is present in the metadata 306 and the second rule may determine whether the description of the corresponding function in the metadata includes a description of one or more parameters associated with the corresponding function and a description of one or more return values associated with the corresponding function.

In an embodiment, the system 102 may be configured to determine one or more parameters associated with each of the set of functions. The system 102 may also determine one or more return values associated with each of the set of functions. Based on the one or more parameters and the one or more return values, the system 102 may detect a presence of the one or more parameters and the one or more return values in a description in the metadata 306 of the corresponding function. The system 102 may be configured to select the subset of functions based on the detection.

In an embodiment, the system 102 may be configured to detect the presence of the one or more parameters and the one or more return values in a description of the corresponding function in the metadata 306. The presence may be detected based on a match between the one or more parameters and the one or more return values in the function definition and the one or more parameters and the one or more return values in the description of the corresponding function. In another embodiment, the metadata 306 may be formatted in a structured format such as, but not limited to, a NumPy Doc Format, a Google® Doc Format, and Java® Doc Format. In such a case, the system 102 may be configured to detect the presence of a parameter or a return value in a field that corresponds to the parameter or a return value in the structured format.

At 418, the computer-executable code 304 may be updated. The computer-executable code 304 may be updated by filtering lines of code (LoCs) corresponding to the subset of functions from the computer-executable code 304. In an embodiment, the computer-executable code 304 may be updated based on the AST of the computer-executable code 304. Details related to the update of the computer-executable code 304 are provided, for example, in FIG. 5 and FIG. 6.

At 420, it may be determined whether more source code files are present in the selected software package. In case more source code files are available in the selected software package, the control may pass to 408. Otherwise, the control may pass to 422.

At 422, it may be determined whether more software packages are present in the package dataset. In case more software packages are available in the package dataset, the control may pass to 406. Otherwise, the control may pass to 424.

At 424, a dataset of code features and respective metadata features may be generated. In an embodiment, the system 102 may be configured to generate the dataset 114 of the code features and respective metadata features. The dataset 114 may be generated based on the updated computer-executable code and the metadata 306. The metadata features may include respective natural language (NL) text portions of the descriptions corresponding to the subset of functions, class names corresponding to the subset of functions, function names corresponding to the subset of functions, and a path of the source code file 302. Details about the dataset 114 are provided in FIG. 7, for example.

In an embodiment, the system 102 may be configured to determine return values corresponding to each function of the subset of functions from the updated computer-executable code to generate the dataset 114.

In an embodiment, the generated dataset 114 may be a dictionary in a key-value format. The keys of the dictionary may correspond to metadata features may include respective natural language (NL) text portions of the descriptions corresponding to the subset of functions, class names corresponding to the subset of functions, function names corresponding to the subset of functions, and a path of the source code file. Also, the keys may further include the code features that may further include the return values and the abstracted code data Details about the abstracted code data are provided, for example, in FIGS. 6A and 6B.

At 426, the language model 106 may be trained on the sequence-to-sequence generation task based on the generated dataset 114. The sequence-to-sequence generation task may be one a code synthesis task, a code retrieval task, or a software package analysis task. Specifically, the language model 106 may be trained to generate lines of computer-executable code for a natural language query as an input to the language model 106. In an embodiment, the language model may be implemented using Deep Neural Network(s) that use an encoder-decoder architecture. If a pre-trained language model exists, then the system 102 may fine-tune the pre-trained language model based on the generated dataset 114. In fine-tuning, examples of the dataset 114 may be used to update parameters such as weights of the pre-trained language model. Details about training the language model 106 are provided, for example, in FIG. 7.

Control may pass to end. Although the flowchart 400 is illustrated as discrete operations, such as 402, 404, 406, 408, 410, 412, 414, 416, 418, 420, 422, 424, and 426. However, in certain embodiments, such discrete operations may be further divided into additional operations, combined into fewer operations, or eliminated, depending on the particular implementation without detracting from the essence of the disclosed embodiments.

Figure 5:
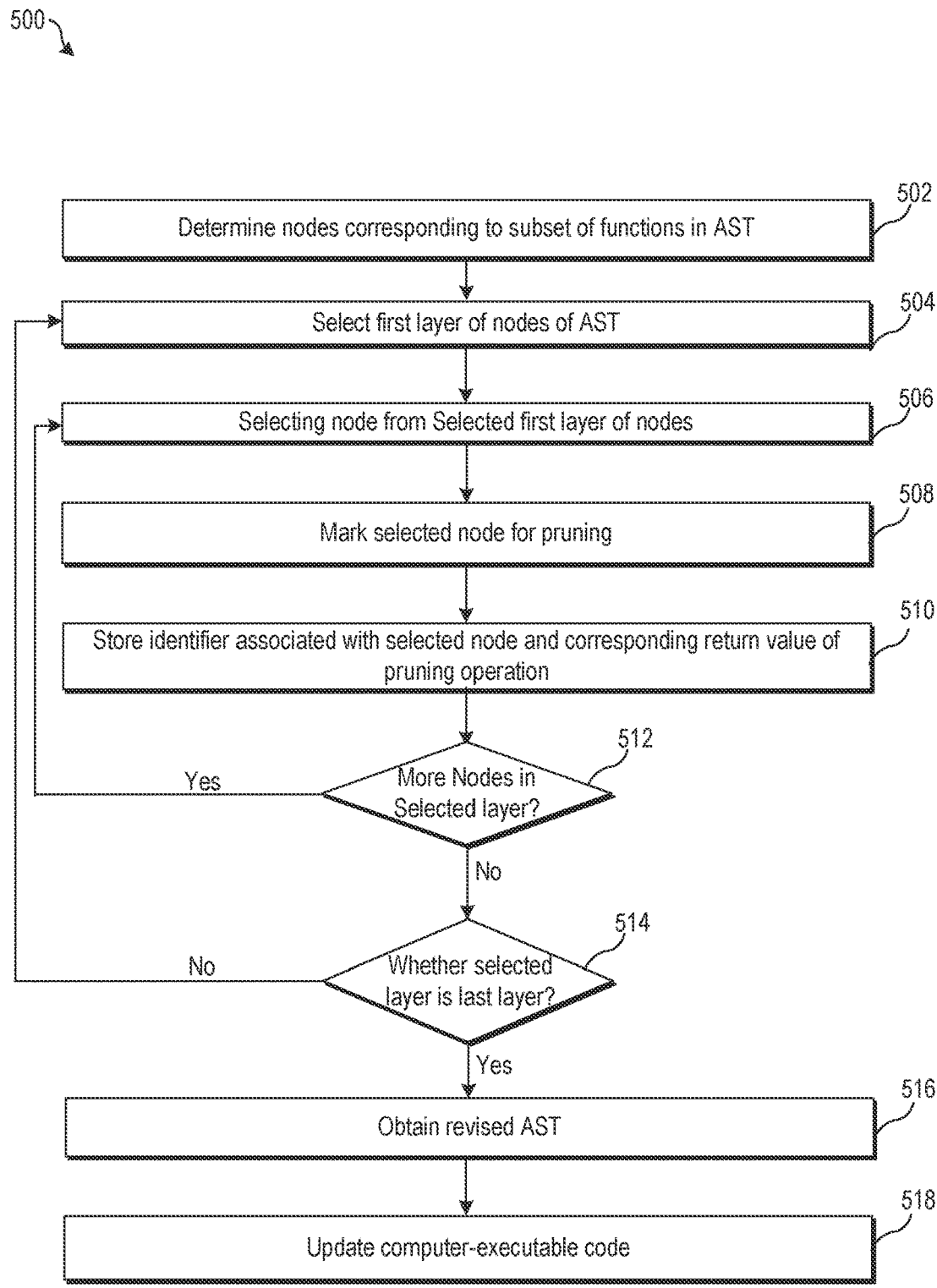
FIG. 5 illustrates a flowchart of an exemplary method of updating a computer-executable code for code synthesis.

FIG. 5 illustrates a flowchart of an exemplary method of updating computer-executable code for code synthesis, according to at least one embodiment described in the present disclosure. FIG. 5 is explained in conjunction with elements from FIG. 1, FIG. 2, FIG. 3, and FIG. 4. With reference to FIG. 5, there is shown a flowchart 500. The method illustrated in the flowchart 500 may start at 502 and may be performed by any suitable system, apparatus, or device, such as by the system 102 of FIG. 1 or FIG. 2.

At 502, nodes corresponding to the subset of functions in the AST may be determined. In an embodiment, the system 102 may be configured to determine the nodes corresponding to the subset of functions in the AST. The AST may be a tree that includes nodes where each node of the tree may denote a construct that may occur in the computer-executable code 304. In an embodiment, the system 102 may be configured to determine the AST corresponding to the subset of functions based on the construct associated with the subset of functions. Details about the subset of functions are provided, for example, in FIG. 4.

At 504, a first layer of nodes of the AST may be selected. In an embodiment, the system 102 may be configured to select the first layer of nodes of the AST. The first layer of the AST may correspond to a topmost layer of the AST corresponding to the subset of functions. In an embodiment, the system 102 may be configured to loop through all the layers of the AST. Details about the plurality of layers are provided, for example, in FIGS. 6A and 6B.

At 506, a first node from the selected first layer of nodes of the AST may be selected. In an embodiment, the system 102 be configured to select the node from the determined nodes (at 502). In an embodiment, the first node of the first layer of nodes of the AST may correspond to a root node of the AST. Each node of the AST may correspond to a construct of the computer-executable code 304.

At 508, the selected node may be marked for a pruning operation. In an embodiment, the system 102 may be configured to mark the selected node for the pruning operation based on a determination that the selected node corresponds to a code component that is different from a function call with one or more parameters.

Specifically, the system 102 may determine parameters associated with the function that may have been used in the function call. In case each of the one or more parameters associated with the function is used in the function call, then the selected node may be marked for the pruning operation. Otherwise, if at least one parameter associated with the function is not used in the function call, then the selected node may not be marked for the pruning operation.

In an embodiment, the pruning operation may correspond to a pruning function that may be executed on the selected node. For example, the pruning function may be "_is_call (node)" function. When executed, the pruning function may extract a segment of the function definition from the AST and may process the extracted segment to check whether function includes the one or more parameters and function calls. If a selected node includes both function call and the one or more parameters, then the pruning function may return True, otherwise, the pruning function may return False.

In another embodiment, the pruning function may return False if there is not any function call in one or more child nodes of the function associated with the selected node. In case the pruning function returns False, the system 102 may be configured to prune the selected node from the AST. Otherwise, the selected node may not be pruned.

In an embodiment, the pruning function may be executed to find function calls that may include the one or more parameter as the input. By collecting such sequence of function calls, the system 102 may have detailed information of the computer-executable codes where the noises (irrelevant line of computer-executable codes) have been filtered out. The sequence of function calls may be utilized to determine an order of the main function in the computer-executable code 304.

In an embodiment, the pruning operation may be executed on the nodes associated with user-defined functions and methods. In another embodiment, the pruning operation may be executed on the nodes associated with user-defined functions and methods, as well as built-in functions. Such execution may be based on configuration that may be done by an administrator of the system 102.

At 510, an identifier associated with the selected node and the corresponding return value of the pruning operation may be stored. In an embodiment, the identifier of the selected node and the corresponding return value of the pruning function may be stored in the memory 204 of the system 102 in a key-value format.

At 512, it may be determined whether more nodes exist in the selected layer of the AST. In case more nodes exist in the selected layer, the control may be transferred back to 506 and a next node in the selected layer may be selected. Otherwise, the control may be transferred to 514.

At 514, it may be determined whether the selected layer is a last layer of the AST. In case the selected layer is not the last layer of the AST, the control may be transferred back to 504 and a next layer may be selected. Otherwise, the control may be transferred to 516.

At 516, the revised AST may be obtained. In an embodiment, the revised AST may be obtained based on the stored identifier and the return value associated with the corresponding node. Specifically, the revised AST may be obtained by the execution of the pruning operation to remove the marked node(s) from the AST. Details about the revised AST are provided for example, in FIGS. 6A, and 6B.

At 518, the computer-executable code may be updated. In an embodiment, the system 102 may be configured to update the computer-executable code 304 by extracting a sequence of function calls. The extracted sequence of function calls may correspond to each function of the subset of functions. In an embodiment, the sequence of function calls may be extracted by using the revised AST.

The system 102 may be further configured to generate abstracted code data by abstracting the sequence of function calls. In an embodiment, the abstraction may correspond to a removal of a function call from the sequence of function calls. In another embodiment, the abstraction may correspond to a modification of the computer-executable based on an addition one or more lines of code (or modification of the one or more lines of code) present in the computer-executable code to negate the impact of the removal of the sequence of functions calls. Details about the abstracted code data are provided, in FIGS. 6A, and 6B.

Figure 6B:
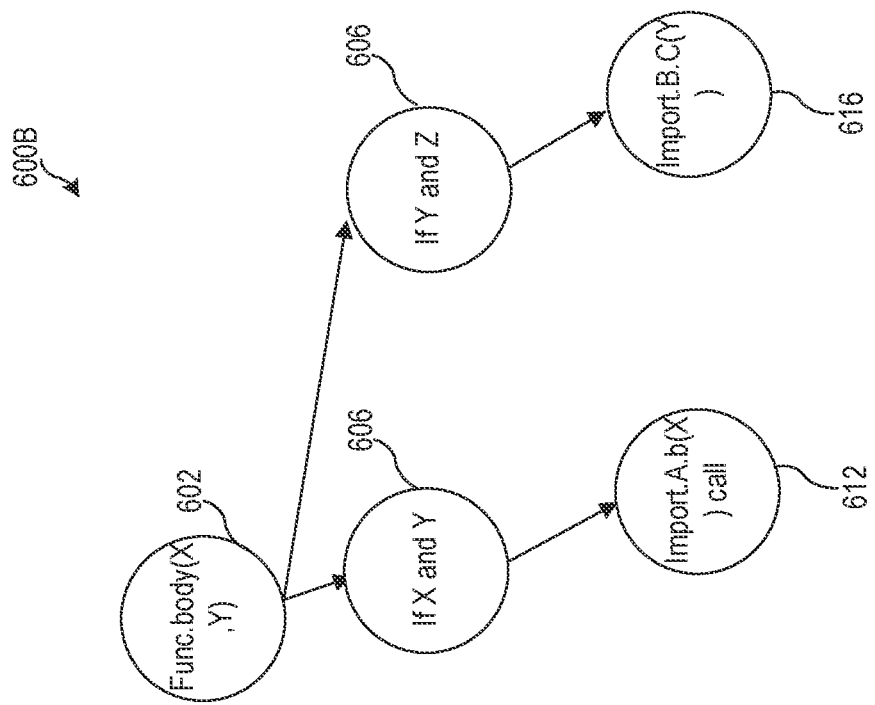
FIG. 6B depicts an exemplary revised AST of a subset of functions obtained from the exemplary AST of FIG. 6A.
Figure 6A:
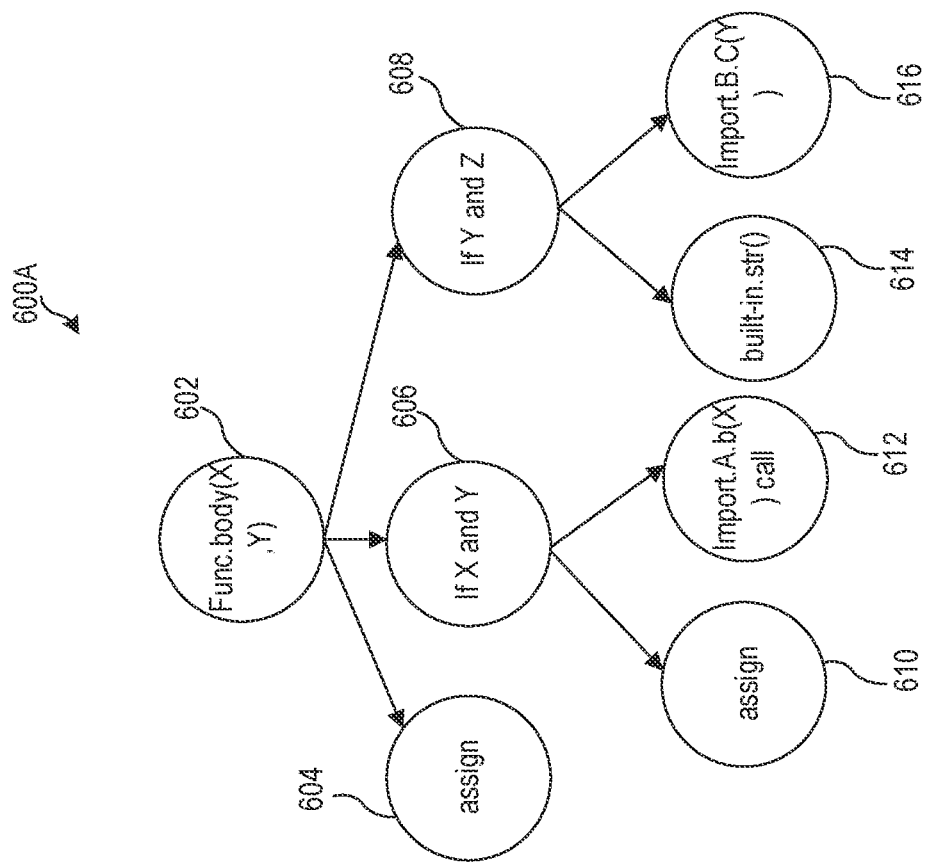
FIG. 6A depicts an exemplary AST of a subset of functions.

FIG. 6A depicts an exemplary AST of a subset of functions, according to at least one embodiment described in the present disclosure. FIG. 6A is explained in conjunction with elements from FIG. 1, FIG. 2, FIG. 3, FIG. 4, and FIG. 5. With reference to FIG. 6A, there is shown an exemplary abstract syntax tree (AST) 600A associated with an exemplary subset of functions. There is further shown a plurality of nodes that may include a first node 602, a second node 604, a third node 606, a fourth node 608, a fifth node 610, a sixth node 612, a seventh node 614, and an eighth node 616.

The system 102 may be configured to receive a source code file that may be associated with a software package. Upon reception, the system 102 may generate the exemplary AST 600 of an exemplary computer-executable code that may be present in the source code file. The exemplary AST 600 may correspond to a tree representation of the abstract syntactic structure of computer-executable code in a particular programming language, such as Python, Java®, C++, or JavaScript. Each node of the tree may denote a construct that may occur in the computer-executable code.

The system 102 may be further configured to determine a set of functions from the computer-executable code based on the AST 600. The set of functions may correspond to the methods and the functions included in code components of the computer-executable code. The code components may include one or more of classes, methods included in the classes, and functions that may be different from the methods. The system 102 may be further configured to extract metadata associated with the set of functions from the computer-executable code. The system 102 may be further configured to select a subset of functions for which descriptions in the extracted metadata satisfy filtering criteria. The subset of functions may be extracted from the set of functions.

In an embodiment, the system 102 may be configured to determine nodes corresponding to the subset of functions in the exemplary AST 600. In an embodiment, the determined nodes corresponding to the subset of functions in the exemplary AST 600 may include the first node 602, the second node 604, the third node 606, the fourth node 608, the fifth node 610, the sixth node 612, the seventh node 614, and the eighth node 616. The first node 602 may be a root node of the exemplary AST 600 and may be in a first layer of nodes (or on a first level). The second node 604, the third node 606, and the fourth node 608 may be child nodes of the first node 602 and may be in a second layer of nodes (or on a second level). The fifth node 610 and the sixth node 612 may be child nodes of the third node 606 and may be in a third layer of nodes (or on a third level). Similarly, the seventh node 614 and the eighth node 616 may be child nodes of the fourth node 608 and may be in the third layer of nodes (or on the third level). The first layer of nodes may be part of a top layer of nodes of the AST 600 and the third layer of nodes may be the last layer of nodes of the exemplary AST 600.

FIG. 6B depicts an exemplary revised AST of the subset of functions obtained from the exemplary AST of FIG. 6A, according to at least one embodiment described in the present disclosure. FIG. 6B is explained in conjunction with elements from FIG. 1, FIG. 2, FIG. 3, FIG. 4, FIG. 5, and FIG. 6A. With reference to FIG. 6B, there is shown an exemplary revised AST 600B associated with an exemplary subset of functions.

In an embodiment, the system 102 may be configured to select the first node 602 from the nodes determined at 502. Thereafter, the selected node may be marked for a pruning operation based on the determination that the selected node corresponds to a code component that is different from a function call with one or more parameters.

Execution of the pruning operation may correspond to an execution of the pruning function of the corresponding node (i.e., the first node 602). As an example, the pruning function may be "_is_call(node)". When executed, the pruning function may extract a segment of the function definition from the AST and may process the extracted segment to check whether the function includes both the one or more parameters and a function call. If a selected node includes both function call and the one or more parameters, then the pruning function may return 'True'. Otherwise, the pruning function may return 'False'. In another embodiment, the pruning function may return False if there is not any function call in one or more child nodes of the function associated with the selected node.

When executed on the first node 602, the pruning operation may return True because the first node 602 has at least one child. When executed on the second node 604, the pruning operation may return 'False' because the second node 604 does not have at least one child. By way of example, and not limitation, the return values of the pruning function for each of the determined nodes of the AST 600 are presented in Table 1, as follows:

TABLE 1

Nodes of the AST with corresponding return values.

| Nodes of the AST | Return Value of Pruning Function |
| --- | --- |
| first node 602 | True |
| second node 604 | False |
| third node 606 | True |
| fourth node 608 | True |
| fifth node 610 | False |
| sixth node 612 | True |
| seventh node 614 | False |
| eighth node 616 | True |

It should be noted that the return values of pruning operation, when executed on the sixth node 612 and the eighth node 616 may be "True" because the corresponding nodes may include the parameters of parent nodes and functions calls to the parent nodes (i.e., the third node 606, and the fourth node 608), respectively.

The system 102 may be further configured to remove all the nodes for which the return value is "False" and obtain the exemplary revised AST 600B based on such removal. In an embodiment, the system 102 may be further configured to extract a sequence of function calls corresponding to each function of the subset of functions by using the exemplary revised AST 600B. The sequence of function calls may be extracted from the computer-executable code. The system 102 may be further configured to generate abstracted code data by abstracting the sequence of function calls. As an example, the abstracted code data may include "Import.A.b (X)", and "Import.A.b(X)".

FIG. 7 is a diagram that depicts an exemplary computer-executable code and an updated version of the exemplary computer-executable code, according to at least one embodiment described in the present disclosure. FIG. 7 is explained in conjunction with elements from FIG. 1, FIG. 2, FIG. 3, FIG. 4, FIG. 5, FIG. 6A, and FIG. 6B. With reference to FIG. 7, there is shown a diagram 700. There is further shown a system 702, a computer-executable code 704, and an updated computer-executable code 706.

In an embodiment, the system 702 may be configured to receive a source code file associated with a software package. The source code file may be retrieved from a data source and may include the computer-executable code 704. As shown, for example, the computer-executable code 704 may include a function "data_filter". The function "data_filter" may have two parameters "jdata" and "selected_user_notebooks" and may return an array as output.

The system 702 may be further configured to generate an updated computer-executable code 706 based on the filtering criteria. Specifically, the system 702 may be configured to update the computer-executable code 704 by filtering lines of code (LoCs) corresponding to the subset of functions from the computer-executable code 704. Details about the filtering lines of code (LoCs) are provided, for example, in FIG. 4.

As shown, for example, the lines of code such as "output=[ ]", "print(db_user, db_notebook)", "found_rec=None", "flag=false", "break", "if found_rec is not None:" and "break" may be filtered out from the computer-executable code 704. Based on the filtering of the LoCs, the system 102 may be configured to obtain the updated computer-executable code 706. In an embodiment, the system 702 may be configured to add one or more lines of code in the computer-executable code 704 so that an objective of the function does not change based on filtering of the LoCs. For example, the system 702 may add "for index, (db_user, db_notebook) in enumerate(selected_user_notebooks):" in the updated computer-executable code 706. Details related to update of the computer-executable code 704 are provided, for example, in FIG. 5, FIG. 6A, and FIG. 6B.

Figure 8:
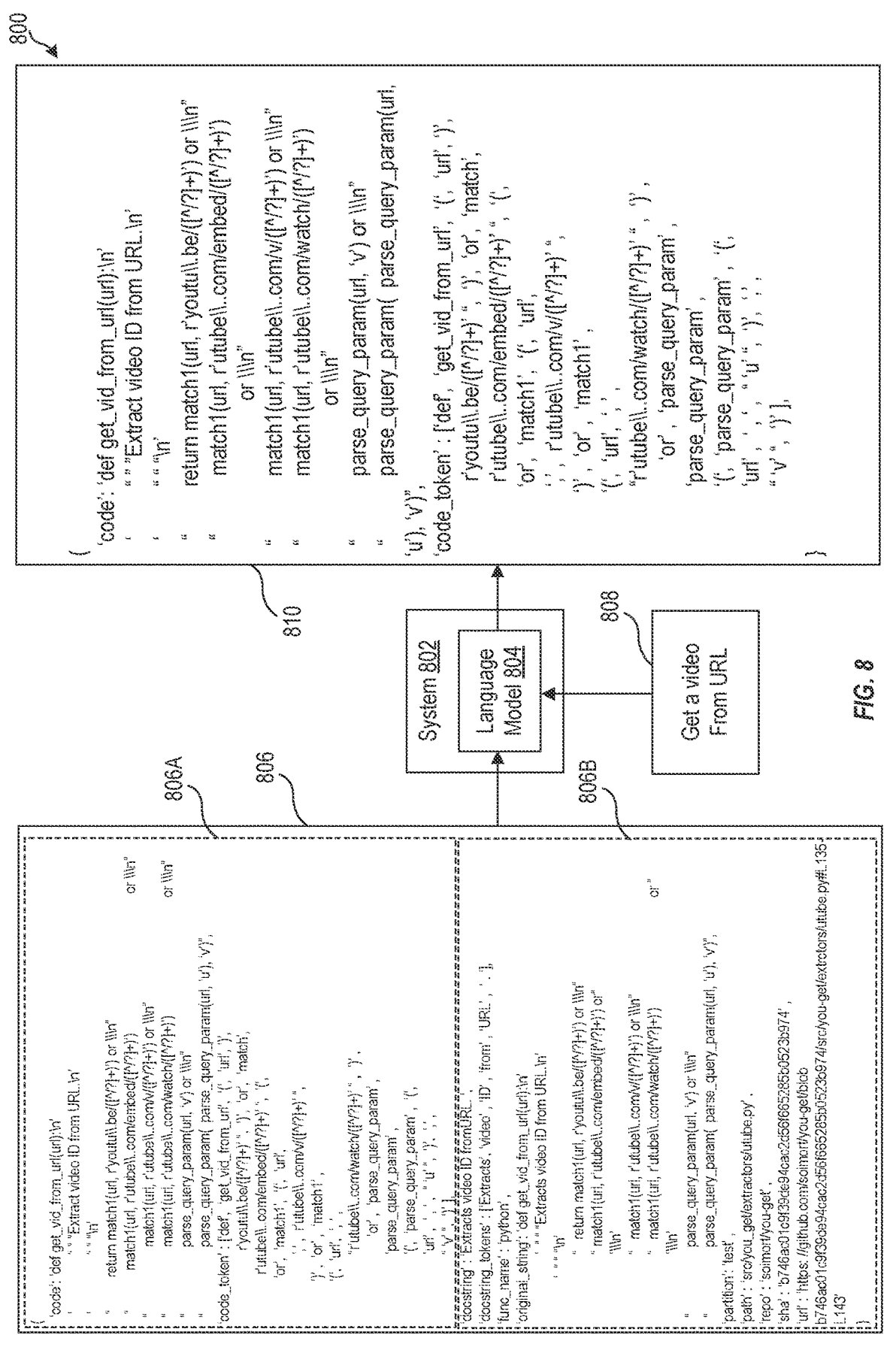

FIG. 8 is a diagram that illustrates an exemplary scenario for training of a language model for code synthesis based on deep parameter learning, in accordance with example embodiments. FIG. 8 is explained in conjunction with elements from FIG. 1, FIG. 2, FIG. 3, FIG. 4, FIG. 5, FIG. 6A, FIG. 6B, and FIG. 7. With reference to FIG. 8, there is shown an exemplary scenario 800. In FIG. 8, there is shown a system 802 that includes a language model 804. There is further shown a first training sample 806 of a plurality of training samples included in the dataset, an input 808, and an output 810.

The system 102 may operate in two phases, i.e. a setup phase and a prediction phase. The system 102 may operate in the prediction phase after one or more operations of the setup phase have been executed.

In the setup phase, the system 802 may be configured to train the language model 804 on a sequence-to-sequence generation task. To train the language model 804, the system 802 may be configured to generate the dataset of code features and respective metadata features as training data based on the updated computer-executable code and the metadata. In an embodiment, the generated dataset may be a dictionary in a key-value format. The generated dataset may include the metadata features as keys that include respective natural language (NL) text portions of the descriptions corresponding to the subset of functions, class names corresponding to the subset of functions, function names corresponding to the subset of functions, a path of the source code file and the corresponding code features.

In an embodiment, a single code feature and a respective metadata feature may be collectively referred to a training sample. The generated dataset may include the plurality of training samples. Each training sample of the plurality of training samples in the dataset may include a code feature and a respective metadata feature. For example, the first training sample 806 of the plurality of training samples may include first code features 806A and a first metadata features 806B.

The language model 804 may be trained on a sequence-to-sequence generation task based on the generated dataset. The sequence-to-sequence generation task may be one of a code synthesis task, a code retrieval task, or a software package analysis task. In an embodiment, the language model 804 may be a deep neural network that may use an encoder-decoder architecture. In an embodiment, the language model 804 may be trained to generate the lines of computer-executable code for a natural language query as an input to the language model 804.

In an embodiment, the system 802 may be configured to extract a code feature and respective metadata feature from the generated dataset. The system 802 may be further configured to generate embeddings of the extracted code feature and the respective metadata feature for training of the language model 804 on the sequence-to-sequence generation task using the generated embedding. In an embodiment, the embedding of the extracted code feature and the respective metadata feature may correspond to a concatenated vector representation of the extracted code feature and the respective metadata feature.

In the prediction phase, the language model 804 may be considered to be a trained model. The system 802 may be configured to receive the input 808. The input 808 may be received from the user 116 via the user device 108 and may include a natural language query. As an example, the natural language query may include a text "Get a video from URL". Based on the received input 808, the system 802 may be configured to apply the trained language model 804 on the received input 808. The system 802 may be further configured to control the language model 804 to generate the output 810 based the application of the language model 804 on the received input 808. The generated output may include the lines of computer-executable code associated with the natural language query, as shown in FIG. 8, for example.

In an embodiment, the system 802 may be configured to fine-tune a pre-trained language model. The fine-tuning of the pre-trained language model may correspond to adjusting the pre-trained language model to achieve desired output or performance. The system 802 may fine-tune the pre-trained language model using the generated dataset. Specifically, the system 702 may update parameters such as weights of the pre-trained language model using the generated dataset.

Various embodiments of the disclosure may provide one or more non-transitory computer-readable storage medium configured to store instructions that, in response to being executed, cause a system (such as the system 102) to perform operations. The operations may include receiving a source code file associated with a software package. The operations may further include generating an abstract syntax tree (AST) of at least a portion of a computer-executable code included in the source code file. The operations may further include determining a set of functions from the computer-executable code, based on the AST. The operations may further include extracting metadata associated with the set of functions from the computer-executable code. The operations may further include selecting, from the set of functions, a subset of functions for which descriptions in the extracted metadata satisfy filtering criteria. The operations may further include updating the computer-executable code by filtering lines of code (LoCs) corresponding to the subset of functions from the computer-executable code. The operations may further include generating a dataset of code features and respective metadata features based on the updated computer-executable code and the metadata and training a language model on a sequence-to-sequence generation task, based on the dataset.

As indicated above, the embodiments described in the present disclosure may include the use of a special purpose or general-purpose computer (e.g., the processor 202 of FIG. 2) including various computer hardware or software modules, as discussed in greater detail below. Further, as indicated above, embodiments described in the present disclosure may be implemented using computer-readable media (e.g., the memory 204 or the persistent data storage 206 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method, executed by a processor, comprising:
receiving a source code file associated with a software package;
generating an abstract syntax tree (AST) of at least a portion of a computer-executable code included in the source code file, the computer executable code including metadata describing functions of the computer executable code;
determining a set of functions from the computer-executable code, based on the AST;
extracting the metadata associated with the set of functions from the computer-executable code;
determining one or more parameters associated with each of the set of functions;
determining one or more return values associated with each of the set of functions;
detecting a presence of the one or more parameters and the one or more return values in a description of a corresponding function in the metadata;
selecting, from the set of functions based on the detecting, a subset of functions for which descriptions in the extracted metadata satisfy filtering criteria, the filtering criteria requires a description of the selected subset of functions be included in the extracted metadata;
updating the computer-executable code by filtering lines of code (LoCs) corresponding to the subset of functions from the computer-executable code;
generating a dataset of code features and respective metadata features based on the updated computer-executable code and the metadata; and
training a language model on a sequence-to-sequence generation task, based on the dataset.

2. The method according to claim 1, further comprising:
receiving a repository address of a package dataset as an input;
extracting a list of software packages from a data source by using the repository address;
selecting the software package from the extracted list of software packages; and
retrieving, from the data source, resource files associated with the selected software package, wherein the retrieved resource files include the source code file.

3. The method according to claim 1, further comprising identifying code components from the computer-executable code by using the AST,
wherein the code components include one or more of: classes, methods included in the classes, and functions different from the methods, and
wherein the set of functions corresponds to the methods and the functions included in the code components.

4. The method according to claim 1, wherein the metadata comprises at least one of a function name, a count of parameters associated with a function, a count of one or more default parameters associated with the function, a default value of the one or more default parameters, a type of each of the parameters, a description of the function, or one or more decorators associated with the function.

5. The method according to claim 4, wherein the description comprises at least one of a description of each of the parameters, a description of a return value associated with the function, a description of the one or more default parameters associated with the function, or a description of an objective of the function.

6. The method according to claim 1, wherein the filtering criteria specifies rules of selecting a function from the set of functions, and
the rules include a first rule to determine whether a description is present in the metadata and a second rule to determine whether the description in the metadata includes:
a description of one or more parameters associated with the function, and
a description of one or more return values associated with the function.

7. The method according to claim 1, further comprising:
determining nodes corresponding to the subset of functions in the AST;
selecting a node from the determined nodes;
marking the selected node for a pruning operation based on a determination that the selected node corresponds to a code component that is different from a function call with one or more parameters; and
obtaining a revised AST by executing the pruning operation to remove the marked node from the AST.

8. The method according to claim 7, wherein the computer-executable code is updated further by:
extracting, from the computer-executable code, a sequence of function calls corresponding to each function of the subset of functions by using the revised AST; and
generating abstracted code data by abstracting the sequence of function calls.

9. The method according to claim 8, further comprising determining return values corresponding to each function of the subset of functions from the updated computer-executable code.

10. The method according to claim 9, wherein the generated dataset is a dictionary in a key-value format and the dataset includes:
the code features that include the return values and the abstracted code data, and
the metadata features which include respective natural language (NL) text portions of the descriptions corresponding to the subset of functions, class names corresponding to the subset of functions, function names corresponding to the subset of functions, and a path of the source code file.

11. The method according to claim 1, wherein the sequence-to-sequence generation task is a code synthesis task, a code retrieval task, or a software package analysis task.

12. The method according to claim 1, further comprising:
receiving an input associated with a natural language query; and
generating lines of computer-executable code based on application of the trained language model on the received input.

13. A non-transitory computer-readable storage medium configured to store instructions that, in response to being executed, causes a system to perform operations, the operations comprising:
receiving a source code file associated with a software package;
generating an abstract syntax tree (AST) of at least a portion of a computer-executable code included in the source code file, the computer executable code including metadata describing functions of the computer executable code;

determining a set of functions from the computer-executable code, based on the AST;

extracting metadata associated with the set of functions from the computer-executable code;

determining one or more parameters associated with each of the set of functions;

determining one or more return values associated with each of the set of functions;

detecting a presence of the one or more parameters and the one or more return values in a description of a corresponding function in the metadata;

selecting, from the set of functions based on the detecting, a subset of functions for which descriptions in the extracted metadata satisfy filtering criteria, the filtering criteria requires a description of the selected subset of functions be included in the extracted metadata;

updating the computer-executable code by filtering lines of code (LoCs) corresponding to the subset of functions from the computer-executable code;

generating a dataset of code features and respective metadata features based on the updated computer-executable code and the metadata; and training a language model on a sequence-to-sequence generation task, based on the dataset.

14. The non-transitory computer-readable storage medium according to claim 13, wherein the operations further comprise:

receiving a repository address of a package dataset as an input;

extracting a list of software packages from a data source by using the repository address;

selecting the software package from the extracted list of software packages; and retrieving, from the data source, resource files associated with the selected software package, wherein the retrieved resource files include the source code file.

15. The non-transitory computer-readable storage medium according to claim 13, wherein the operations further comprise identifying code components from the computer-executable code by using the AST, wherein the code components include one or more of classes, methods included in the classes, and functions different from the methods, and wherein the set of functions corresponds to the methods and the functions included in the code components.

16. The non-transitory computer-readable storage medium according to claim 13, wherein the metadata comprises at least one of a function name, a count of parameters associated with a function, a count of one or more default parameters associated with the function, a default value of the one or more default parameters, a type of each of the parameters, a description of the function, or one or more decorators associated with the function.

17. The non-transitory computer-readable storage medium according to claim 16, wherein the description comprises at least one of a description of each of the parameters, a description of a return value associated with the function, a description of the one or more default parameters associated with the function, or a description of an objective of the function.

18. A system, comprising:

a processor configured to:

receive a source code file associated with a software package;

generate an abstract syntax tree (AST) of at least a portion of a computer-executable code included in the source code file, the computer executable code including metadata describing functions of the computer executable code;

determine a set of functions from the computer-executable code, based on the AST;

extract metadata associated with the set of functions from the computer-executable code;

determine one or more parameters associated with each of the set of functions;

determine one or more return values associated with each of the set of functions;

detect a presence of the one or more parameters and the one or more return values in a description of a corresponding function in the metadata;

select, from the set of functions based on the detection, a subset of functions for which descriptions in the extracted metadata satisfy filtering criteria, the filtering criteria requires a description of the selected subset of functions be included in the extracted metadata;

update the computer-executable code by filtering lines of code (LoCs) corresponding to the subset of functions from the computer-executable code;

generate a dataset of code features and respective metadata features based on the updated computer-executable code and the metadata; and train a language model on a sequence-to-sequence generation task, based on the dataset.

* * * * *